April 25, 1933.   R. H. STONE   1,905,762
DIE
Filed May 8, 1929   5 Sheets-Sheet 1

April 25, 1933.                R. H. STONE                1,905,762
                                  DIE
                         Filed May 8, 1929          5 Sheets-Sheet 2

INVENTOR
R. H. Stone
BY
Thomas Howe
ATTORNEY

April 25, 1933.  R. H. STONE  1,905,762
DIE
Filed May 8, 1929  5 Sheets-Sheet 4

INVENTOR
R. H. Stone
BY Thomas Howe
ATTORNEY

April 25, 1933.　　　R. H. STONE　　　1,905,762
DIE
Filed May 8, 1929　　　5 Sheets-Sheet 5

R. H. Stone  Inventor
By his Attorney
Thomas Howe

Patented Apr. 25, 1933

1,905,762

UNITED STATES PATENT OFFICE

R. HARRY STONE, OF IRVINGTON, NEW JERSEY, ASSIGNOR TO TITEFLEX METAL HOSE CO., A CORPORATION OF NEW JERSEY

DIE

Application filed May 8, 1929. Serial No. 361,417.

This invention relates to strip-formed tubes and particularly to dies for use in manufacturing flexible tubes having fixed joints between adjacent convolutions and a groove extending longitudinally of said strip.

It is an object of this invention to improve the construction by simplifying the manufacture and utilizing replaceable parts where but one was previously used and in arranging these parts so that they will resist the strain upon them as effectively as the previously used unitary structures. This is accomplished by properly shaping the parts to cooperate with each other and with the working surfaces which are used.

Another object is to replace certain portions of such a die which are subject to the heaviest wear with readily renewable rotating elements and in determining at what location on the working surface such rotatable elements are most effective.

A further object is to position a roller in a die of the nature indicated at the point where the strip, which is used in making the tubing, enters the die.

A still further object is to position a roller in a die of the nature indicated at the point where the seam is formed within the die.

Other and more definite objects will appear from the following specifications, claims and drawings, in which:

Figure 1:
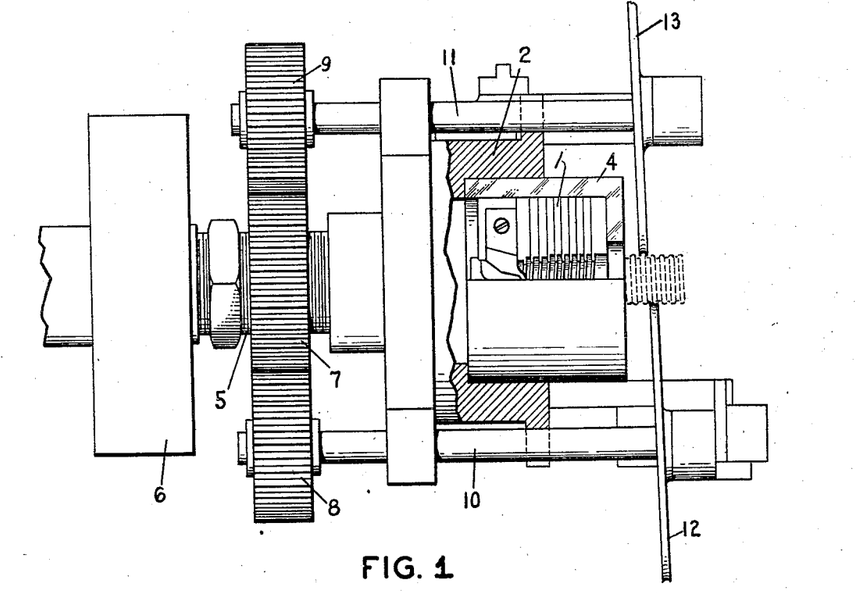
Fig. 1 shows a plan view of my improved form of die in position in the drive head of a tube forming machine, adjacent parts being broken away.
Figure 2:
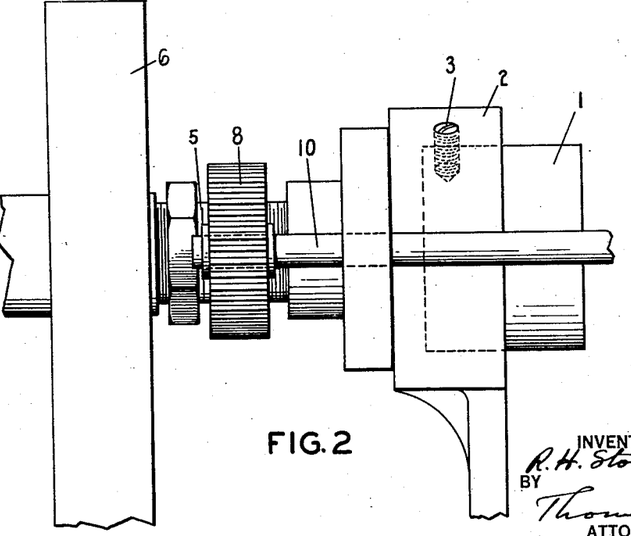
Fig. 2 shows a side view of the machine indicated in Fig. 1.

Referring now more particularly to Fig. 1 of the drawings, the die 1 is held in place in the holder 2 by the machine screw 3 bearing on the die casing 4. This machine is the same as shown in patent to Brinkman, et al., Number 1,492,067, April 29, 1924, and includes the rotary hollow spindle 5 and bearing 6. The gear 7 is secured to the spindle and the gears 8 and 9 drive the shafts 10 and 11 respectively to which are secured the rotating grooved wheels 12 and 13, for purposes to be described later.

Figure 3:
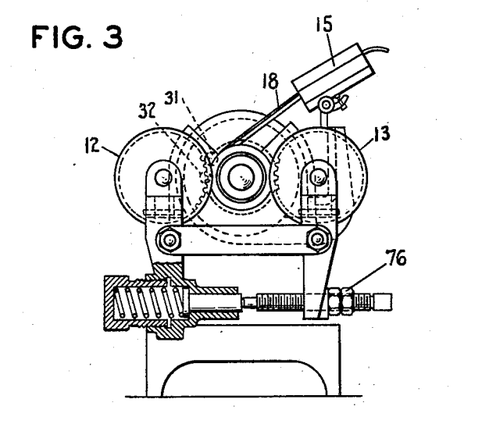
Fig. 3 shows an end elevation on a reduced scale of the machine utilizing the die, parts being in section indicating the relation of the die and the strip from which the tubing is constructed.

The strip of blank material is fed to a preliminary former 15, more particularly shown in Fig. 3. Here it is grooved to the proper shape (Fig. 13) to cause it to fit over the upturned edge of the end of the tubing already formed in the die so that continuous operation will cause successive turns of the bent strip to be connected and rigidly joined to the tubing in a progressive manner as shown in Figs. 13, 14, 15, 16 and 17.

Figure 4:
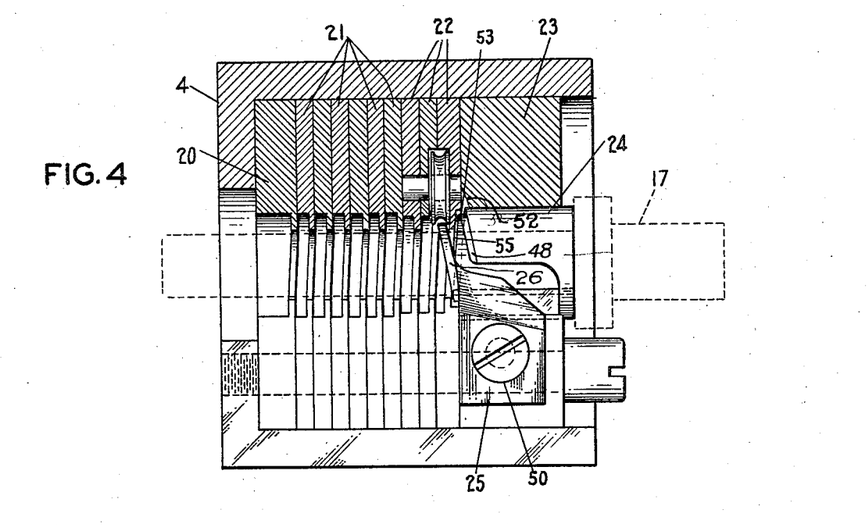
Fig. 4 shows a partial sectional view of my die along the lines 4—4 of Fig. 5.

The bending operation of the strip within the die is substantially the same as that indicated in Patent No. 1,492,067 except for differences produced by slight variation of the surface contours presented as will appear in connection with the patent. The movement of the tube through the die from right to left as indicated in Fig. 4 is produced by the rotation of the mandrel shown at 17 by dotted lines. As this mandrel rotates it causes the strip 18 which is fed through the preliminary former 15 to be wound around the mandrel causing it to move therewith. The die remaining stationary produces a movement of the tube which is being formed therein, from right to left, finally passing off the mandrel and to a suitable container.

Figure 5:
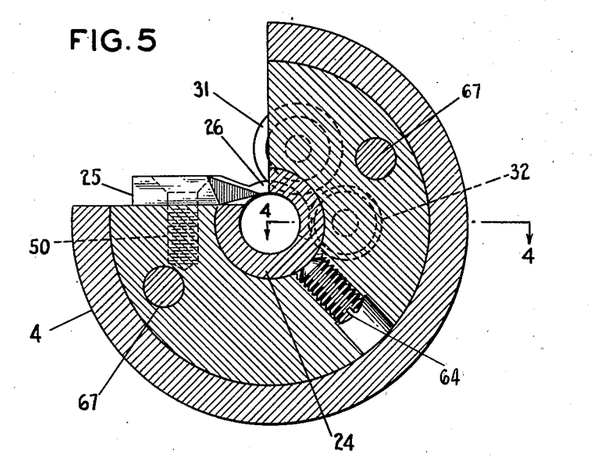
Fig. 5 shows a sectional view along the lines 5—5 of Fig. 6.

As will appear from Fig. 4, the die includes the housing 4, a plurality of stripping plates 20 and 21, the plate 20 acting also as an end plate, and separately shaped forming plates or pieces 22, 23 and 24, plate 23 acting as a backing plate. Forming plate or piece 24 (also shown in Figs. 5, 6 and 7) is surrounded by the plate 23 to which it is held by a screw 64 (Fig. 5), and is a removable bushing forming a bearing for the mandrel 17. Plate 23 carries the semi-circular finger 26 secured to it at 25 by the screw 50 as shown in Fig. 5. These parts are maintained in position by the plate 23 and clamped to the housing 4 by screws 67 (Fig. 6) which engage screw threads in the bottom of the housing as shown at 68. The stripping plates are so called because their main function is to cause the completed tube to progress along the die so as not to become jammed.

Relation of these parts is clearly indicated in connection with Figs. 4 to 10 inclusive. The end plate 20 is shown separated from the die in Fig. 7 and has a flat side 28 which abuts the end of holder 4 against the surface 29. The opposite side of the plate 20 is constructed with a helical configuration of considerable radial extent which fits into a corresponding recess in the adjacent plate 21, thereby forming a close fit and firm support. The pitch of this helical surface is obviously the same as that desired for the tube in its completed condition. The stripping plates 21 each have both surfaces of this same pitch. The forming plate 22 is of substantially the same configuration as the stripping plates except that it is desirable that it be somewhat thicker and may be composed of more durable material. The die also includes the spirally shaped rollers 31 and 32 between the stripping plates and the forming plate. The roll 31 is formed with projecting integral pin 33 while the roll 32 is mounted upon the shaft 35, securely held in place in the group 36 of stripping plates 21. This shaft 35 may be maintained in position by any suitable means and may be made adjustable radially with respect to the stripping plates by means of screw 38. Screw 38 also aids in maintaining the parts in position. The radial adjustment may be accomplished by making the hole for the shaft slightly larger than necessary so that the shaft will be compressed against one side of the hole or shims may be properly positioned about the shaft before the screw is clamped on. Thus, the wheel or roll 32 may be properly positioned radially with respect to the axis of the die and has substantially the same effect as the external rollers of the above patent.

Figure 9:
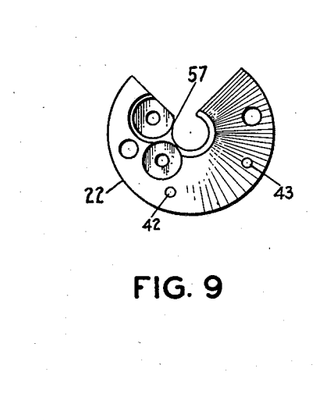

The first stripping plate 21' is provided with proper recesses to accommodate these rolls and the forming plate 22 has corresponding recesses therein, both to furnish an end bearing for the shaft 35 and also the pivot 33. Additional stub shafts 40 and 41 may also be provided if desired, which project into holes 42 and 43 respectively in the forming plate 22 as shown in Fig. 9, to maintain the parts in proper alignment under conditions of strain such as would occur during the operation of the die.

The backing plate 23 is also provided with a helical surface 45 to cooperate with the surface 46 of the forming plate 22. The forming plate or bushing 24 has a correspondingly shaped surface 48 at one end. The other end of the plate 24 is spirally developed. This plate or bushing 24 cooperates with the backing plate 23, which surrounds it, and forms a bearing for the mandrel 17. Plate 24 is held in place by the screw 64, and plate 23 is shown in Fig. 5. Forming or backing plate 23 carries the semicircular finger 26, secured to it at 25 by screw 50, more clearly shown in Figs. 4, 5 and 6.

Figure 10:
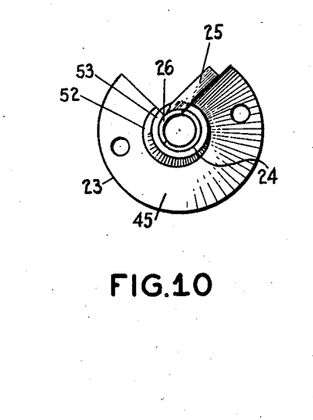
Figure 14:
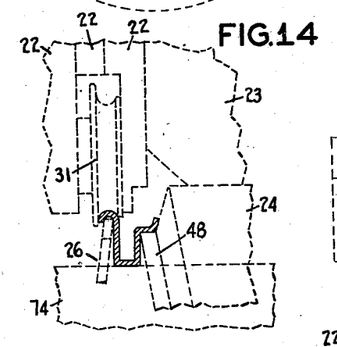
Figs. 14, 15, 16 and 17 are enlarged views, partly in section, of the die, mandrel and show the formation of the strip at different stages of its passage through the die.
Figure 15:
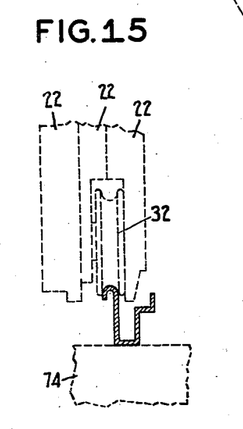
Figure 16:
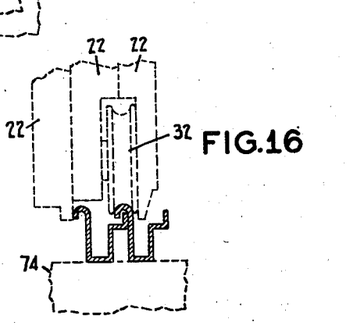
Figure 17:
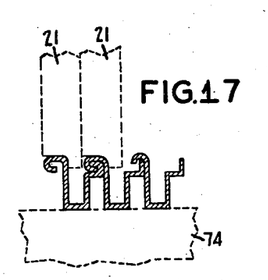

The helical surface of the backing plate is shown in Fig. 10 and includes a cutaway portion 52 to insure that the surface of this plate will not interfere with the forming action of the surface 53 of the forming plate and bushing 24. The shape of this surface 53 on this bushing is more clearly shown in Fig. 4 and cooperates with a recess 55 on the forming plates 22. The projection 48 on this surface extends into this recess 55 substantially filling it except for a small space therebetween provided for the passing of the bent strip and is provided with a predetermined slope and pitch. As the strip progresses along this passage it is given a slight flange increasing as it moves about the surface 48 of bushing 24 so as to cooperate with the hooked portion of the strip as it is fed ordinarily to the die (Figs. 14, 15). This, of course, occurs only at the beginning of the second revolution of the strip about the mandrel.

Each one of the stripping pieces and the end plate as shown is provided with a radially extending fin 77 one side of which is flush with one surface of the respective pieces. One side of the forming piece is substantially the same as that of the stripping pieces except for the fact that a slight relief 57 (Fig. 9) is given the inner edge of this fin in order to more nearly conform to the shape taken by the strip as it enters the die.

Figure 6:
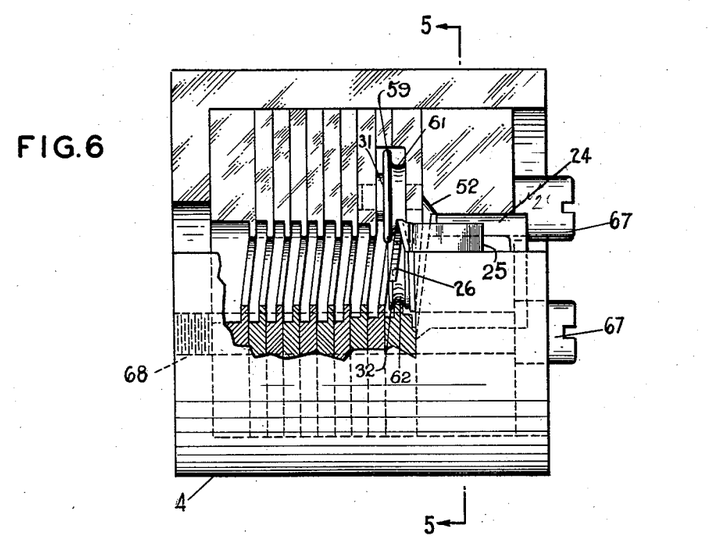
Fig. 6 shows a plan view of my die looking downwardly on Fig. 5.
Figure 7:
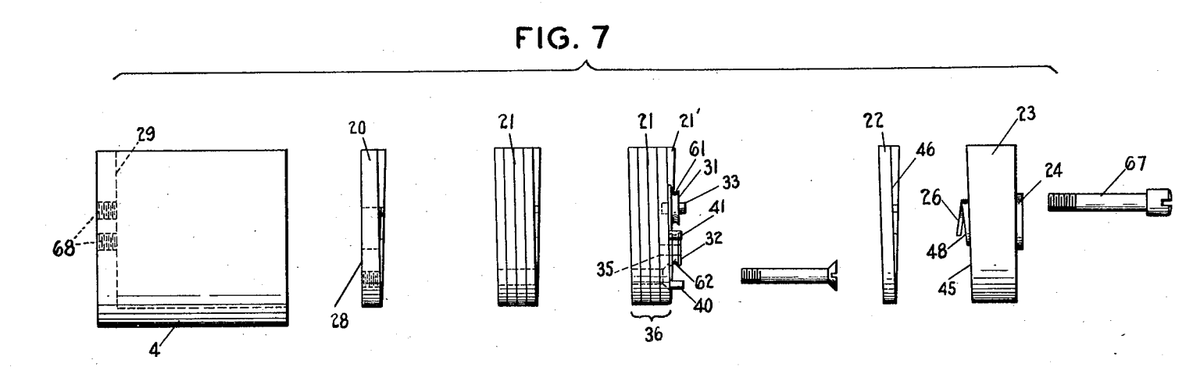
Fig. 7 shows an "exploded" view of the parts of my die in the position they would assume if separated in a straight line.
Figure 8:
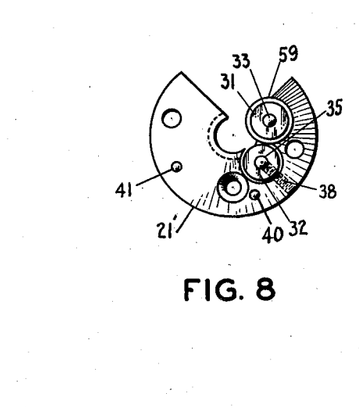
Figs. 8, 9 and 10 show details of some of the die pieces comprising my die.
Figure 12:
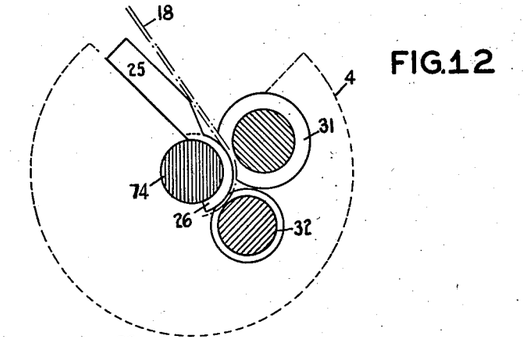
Fig. 12 is an enlarged diagrammatic view, showing the finger and its relation to the strip, the rollers and the mandrel, the mandrel and rollers being shown in section.
Figure 13:
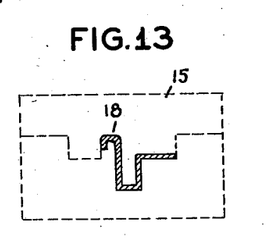
Fig. 13 shows the form of the strip as it leaves the former 15 (shown in Fig. 3) and is fed to the rolls.

It has been found that the forming portion of the die is subjected to the greatest strain and, therefore, the most wear and by properly incorporating the rolling elements instead of entirely relying on frictional action to produce the bending of the strip, far greater durability results. It has been found that roll 31 positioned at the point where the strip enters the die and constructed with a flange 59 extending downwardly into the die as shown in Figs. 6, 12 and 14, in order to insure that the upturned flange of the second turn of the strip will be interlocked with the bead of the strip as it enters the die, improves the action resulting and lessens the wear taking place. The semi-circular extension or finger 26 passes sufficiently close to the grooved surface 61 of this wheel (Figs. 12, 14) so as to fit within the corrugation of the incoming strip both for the purpose of preventing its collapse and to aid in the shaping action, it being borne in mind that this extension is supported by the mandrel and comes into frictional engagement therewith. It is also desirable that this finger 26 be thicker at its free end (Fig. 12) than at the end which is secured so that a tighter clinching action will be applied to the seam under the roll 32.

Thus, the wheel 31 aids in performing the act of bending the strip into a circular shape. The additional shaping roll 32 has its outer grooved shaped surface 62 positioned more closely to the extension 26 so as to compress the bead and clinch it on to the flange of the strip in its second rotation about the mandrel. The seam thus formed may be either more or less tightly sealed according to the radial position of the axis of the shaft 35 with relation to the axis of the die and the surface of the mandrel which supports the extension 26. As previously indicated this may be more readily adjustable when using a roll than would be the case where the integral part of the die were utilized inasmuch as rolls of various sizes may be readily used and the shaft of the roll for supporting the roll may be slightly adjusted if necessary.

The bushing 24 is also subject to considerable wear but may be readily replaced by loosening the screw 64 as shown in Fig. 5.

In order that all the parts may be clamped into a unitary structure they are all provided with holes to accommodate screws 67 which are common holding means passing through each piece and screw threaded at 68 in the bottom of the retaining cylindrical housing 4. Also, pins 35, 40 and 41 aid in preventing movement when the parts are clamped together. Thus the die may be properly positioned within the holder 2 of the machine as a unit and together with the mandrel be properly adjusted apart from the machine with insurance that this adjustment will be maintained during operation.

In the above mentioned patent, rollers are carried by a stationary part beyond the rotating mandrel which cooperate with rotating driven rolls similar to 12 and 13 herein. This construction is effective with tubes of sufficient size to permit the use of these inner rolls but where the size of the tube is smaller it is impossible to use inner rolls so that stationary externally threaded piece 70 (Fig. 11) is used in place of the rolls. However, it is possible to do without these rolls, particularly where the tube sizes are small.

Figure 11:
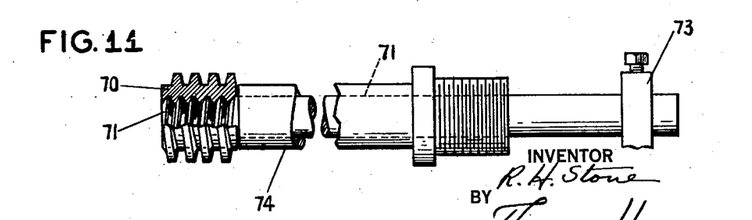
Fig. 11 shows a modified form of mandrel for use in connection with my die.

This extension is supported by the screw-threaded piece 71 threaded in the proper direction to prevent its removal due to the rotation of the tubing. This threaded portion 71 extends backward through the hollow mandrel 74 and beyond the head of the machine to a proper stationary clamping device 73 which prevents this part from rotating. The hollow mandrel 74 is rotated in the same way as above described and indicated in connection with the patent to Brinkman et al. referred to hereinbefore. This thread 70 cooperates with and substantially conforms to the inner surface of the tubing causing it to progress from right to left during rotation of the tube and mandrel.

In order to improve the seam thus formed and to aid in the rotary movement of the tubing, wheels 12 and 13, properly geared as previously indicated, bear directly upon the seam of the tubing adjacent to the point in which the threaded portion 70 lies. These wheels 12 and 13 are grooved and adjustable by means of the adjustment 76 indicated in connection with the patent above referred to. This action improves the seam of the tubing for some purposes but may be dispensed with where great tightness of the joints is not essential.

It thus appears that the helical inner surface of the die is produced by placing properly shaped pieces one above the other to the desired height and the parts securely maintained in position where heretofore a single unitary structure at considerable expense and difficult to manufacture was utilized. By this construction, fins which have been broken off or worn may be readily replaced by merely substituting one standard part for another. By the use of the rolls previously described the parts which are subject to the greatest strain are made to be readily adapted for manufacture according to quantity production methods whereas previously constructed die elements were required to be entirely formed by hand. Also, on account of the separation of the pieces, strains which are imparted to one piece do not necessarily affect another and the strength of a laminated structure is produced. Thus when some obstacle might appear with an integral die, a breakage might involve the die in its entirety whereas with the present die the breakage would be limited to a single replaceable element. The positioning of the radial fin so that its upper surface coincides with that of the piece and providing recessed area underneath also aids in the effectiveness of the die both in its resistance to strain and as to the easy movement of the tubing thereon. It is apparent that if the position of the fin were reversed there would be likelihood of binding in portions of the tubing between adjacent pieces owing to the pressure against the tubing at the fin as it is being forced off the mandrel.

The strip of blank material is fed to a preliminary former 15, Fig. 3, where it is grooved to the proper shape (Fig. 13) to fit over the upturned edge of the end of the tubing already formed in the die. The strip now passes over the preliminary bending roll 31, where it is bent into a circular roll (Fig. 14), the flange 59 of this roller 31 insuring that the upturned flange of the second turn of the strip will be interlocked with the head of the strip entering the die. The shaping roll 32 cooperating with the bending roller 31 and finger 26 (Figs. 12, 14) compresses the bead on the strip and clinches it to the flange in its second rotation about the mandrel. From the bending roll 32, the strip enters the cam walls of the die in the forming plates 22 where the adjacent convolutions of the strip are interfolded forming the tube (Figs. 15, 16 and 17); the tube then passes into the stripping plates 21, where, due to the rotation of the mandrel, the tube is drawn through the die. After leaving the die the tube encounters the spinning rolls 12 and 13, which bear upon the exterior of the seam, these rolls being grooved to conform to the desired exterior of the tube, as described in patent to Brinkman, et al. No. 1,492,067, April 29, 1924, hereinbefore referred to.

Considerable variation and departure could well be made according to this invention and it is not desired to be limited to the exact construction and detail set forth.

Having thus described my improved die in what I deem its best form, other variations are intended to be anticipated and I desire to be limited only to the extent specified in the following claims.

What I claim is:

1. In an apparatus for forming tubing from a strip, the combination with a rotating mandrel, of a die about said mandrel, said mandrel gripping the strip to draw it through the die, said die having channels with cam walls adapted to bend the strip transversely and to interfold the edges of adjacent convolutions of said strip and a bending roll positioned adjacent the point where the strip enters into the die for preliminarily bending the strip before it enters said channels.

2. In an apparatus for forming tubing from a strip, the combination with a rotating mandrel, of a die about the same, said mandrel gripping said strip to draw it through said die, said die having channels with cam walls adapted to bend the strip transversely and to interfold the edges of adjacent convolutions of the strip and a bending roll positioned adjacent the point where the strip enters into the die and against which the strip is preliminarily bent into a circular form before entering said channels.

3. In an apparatus for forming tubing from a continuous strip, the combination with a rotating mandrel, of a die about said mandrel, said mandrel gripping said strip to draw it through the die, said die having forming channels with cam walls adapted to interfold the edges of adjacent convolutions of the strip and stripping channels for forcing the tube along the mandrel, and said die comprising one or more rollers adapted to guide and bend the strip in forming it into the tube.

4. In an apparatus for forming tubing from a continuous strip, the combination with a rotating mandrel, of a die about said mandrel, said mandrel gripping said strip to draw it through the die, said die having forming channels with cam walls adapted to interfold the edges of adjacent convolutions of the strip and stripping channels for forcing the tube along the mandrel and said die comprising one or more rollers adapted to guide and bend the strip in forming it into the tube, and means for radially adjusting one of said rollers.

5. In an apparatus for forming tubing from a continuous strip, the combination with a rotating mandrel, of a die about said mandrel, said mandrel gripping said strip to draw it through the die, said die having helical forming channels with cam walls adapted to interfold the edges of adjacent convolutions of the strip and helical stripping channels for forcing the tube along the mandrel, and said die comprising a succession of bending rolls adapted to preliminarily bend the said strip preparatory to its entry into said cam walled channels.

6. A die for forming tubing from a strip, comprising in combination a forming part and a stripping part for moving the formed tube longitudinally through the die, said forming part including a succession of rolls mounted therein adjacent the point where the strip enters the die, so positioned that the preliminary bending action in a circular direction will be applied against said rolls, said stripping part including a plurality of similar shaped portions each having a radially extending rib projecting inwardly from the surface of one side.

7. In an apparatus for forming a tube from a strip, the combination with a rotating mandrel, of a die about the same, said mandrel gripping said strip to draw it through said die, said die comprising a forming part adapted to form said strip into a tube and a stripping part adapted to move said tube along said mandrel, said forming part comprising a succession of bending rolls adjacent the point where the strip enters the die, said rolls bending the strip to partially form it into the tube, said stripping part including a plurality of similar shaped portions each having a radially extending rib projecting inwardly from the surface of one side and the other side being cut back to form a groove with the next adjacent portion.

8. In an apparatus for forming tubing from a strip, the combination with a rotating mandrel, of a die about said mandrel, said mandrel being adapted to grip the strip to draw it through the die, the said die comprising a forming part adapted to interfold the edges of adjacent convolutions of the strip and a stripping part adapted to move the tube along the mandrel, said forming part having a succession of bending rolls and said stripping part including a plurality of similar-shaped portions each in the form of a washer with a radial circular indentation in the central portion.

9. In an apparatus for forming tubing from a strip, the combination with a rotating mandrel, of a die about said mandrel, said mandrel being adapted to grip the strip to draw it through the die, the said die comprising a forming part adapted to interfold the edges of adjacent convolutions of the strip and a stripping part adapted to move the tube along the mandrel, said forming part having a succession of bending rolls and said stripping part including a plurality of similar-shaped portions each in the form of a washer with a radial circular indentation in the central portion and constructed with offset ends having such a pitch that when assembled together one beside the other, the said washer-shaped portions will be nested together so that they form continuations of each other.

10. In an apparatus for forming tubing from a strip, the combination with a rotating mandrel, of a die about the same, said mandrel gripping said strip to draw it through said die, said die comprising a forming part adapted to interfold the edges of adjacent convolutions of the strip and a stripping part for moving the tube along the mandrel, said forming part comprising a bending roll adjacent the point where the strip enters the die adapted to preliminarily bend said strip, and a bushing at one end of said die forming a bearing for said mandrel, said bushing also having a sloped end face adjacent said roll and cooperating with the said forming part of said die for forming the strip, and means for securing said bushing in position with relation to said die.

11. In an apparatus for forming tubing from a strip, the combination with a rotating mandrel, of a die about the same, said mandrel gripping said strip to draw it through said die, said die comprising a forming part adapted to interfold the edges of adjacent convolutions of the strip, and a stripping part adapted to move said tube along said mandrel, said forming part comprising a bending roll mounted in said forming part adjacent the point where the strip enters the die and adapted to preliminarily bend said strip, a bushing at one end of said die and forming a bearing for said mandrel, said bushing also having a sloped end face adjacent said roll and co-operating with the forming part of said die to partially form said strip, a clamping part adapted to retain said bushing in proper relation to said die and means for adjustably retaining said bushing in position with relation to said clamping member.

12. In an apparatus for forming tubing from a strip, the combination with a rotating mandrel, of a die about the same, said mandrel gripping said strip to draw it through said die, said die comprising a forming part adapted to interfold the edges of adjacent convolutions of the strip and a stripping part adapted to move the tube along the mandrel, said forming part comprising bending rolls adapted to partially form the strip into the tube, said stripping part comprising a plurality of sections of the same shape placed adjacent each other longitudinaly of the mandrel, said stripping part of said die being adjacent the said forming part of said die and displaced longitudinally thereof, a hollow cylindrical retainer for said forming and stripping parts and common means for retaining the said parts within said retainer.

13. In an apparatus for forming tubing from a strip, the combination with a rotating mandrel, of a die about the same, said mandrel gripping said strip to draw it through said die, said die comprising a forming part adapted to interfold the edges of adjacent convolutions of the strip and a stripping part adapted to move the tube along the mandrel, said forming part including a succession of bending rolls adapted to preliminarily bend the strip at its entry into the die, said stripping and forming parts being longitudinally adjacent each other, a backing plate having a removable bushing therein, said bushing cooperating with the forming part of said die to transversely bend the strip, an end plate, a housing for retaining said parts and common clamping means for securing said parts in proper relative position.

14. In an apparatus for forming tubing from a strip, the combination with a rotating mandrel, of a die about the same, said mandrel gripping said strip to draw it through said die, said die including a forming portion adapted to interfold the edges of adjacent convolutions of the strip and including an entrance roll and a forming roll for the strip and an arc-shaped finger adapted to support the strip and force it against said rolls.

15. In an apparatus for forming tubing from a strip, the combination with a rotating mandrel, of a die about said mandrel, said mandrel gripping said strip to draw it through the die, said die comprising a cylindrical retaining housing, an end plate having one flat side and another side of helical configuration of considerable radial extent, a plurality of additional flat similarly-shaped pieces with both sides of the same pitch as the helical side of said end plate forming a screw-thread for moving the tube along the mandrel, a forming part positioned longitudinally in advance of the said additional pieces and comprising strip bending rolls adjacent the entrance of the strip into the die and a backing plate having one face conforming to the helical configuration of said additional pieces and one flat face and clamping means for securing said plates and pieces in concentric position in said housing.

16. In an apparatus for forming tubing from a strip, the combination with a rotating mandrel, of a die about said mandrel, said mandrel gripping said strip to draw it through the die, said die comprising a cylindrical retaining housing, an end plate having one flat side and another side of helical configuration of considerable radial extent, a plurality of additional flat similarly-shaped pieces with both sides of the same pitch as the helical side of said end plate forming a screw-thread for moving the tube along the mandrel, said pieces each having an integral radial fin extending evenly from one side, said die also having a forming portion for the tube positioned longitudinally in advance of the said additional pieces and comprising strip bending rollers adjacent the entrance of the strip into the die, a backing plate having one face of helical configuration conforming to the helical configuration of said additional pieces, and one flat face, and clamping means for securing the said plates, portions and pieces in concentric position in said housing.

17. In an apparatus for forming tubing from a continuous strip, the combination with a rotating mandrel, of a die about said mandrel, said mandrel gripping said strip to draw it through the die, said die having a forming portion including an entrance roll and a forming roll for the strip, and an arc-shaped finger of increasing radial thickness toward its free end adapted to support the strip and force it into engagement with said rolls.

18. In an apparatus for forming tubing from a strip, the combination with a rotating mandrel, of a die about said mandrel, said mandrel gripping said strip to draw it through the die, said die having a forming portion including an entrance roll and a forming roll for the strip, and an arc-shaped finger of increasing radial thickness toward its free end and adapted to support the strip and force it into engagement with said rolls whereby the first roll will preliminarily form the strip and the second roll will tightly press the interfolded parts of adjacent convolutions into tighter relationship.

19. In an apparatus for forming tubing from a strip, the combination with a rotating mandrel, of a die about said mandrel, said mandrel gripping said strip to draw it through the die, said die comprising a housing member, a forming part adapted to interfold the edges of adjacent convolutions of the strip and a stripping part, said forming part including a succesion of bending rolls positioned adjacent the point where the strip enters within the die and adapted to preliminarily bend said strip, said die also including a stripping part following said forming part and adapted to move the tube along the mandrel, said stripping part including a plurality of similarly-shaped portions each in the form of a washer with a radial circular indentation in the central portion and having off-set ends of such a pitch that when the portions are fitted together to form the stripping part the said washers will form continuations of each other, all of said portions being within said housing and clamping means adapted to retain said portions within said housing.

20. In an apparatus for forming tubing from a strip, the combination with a rotating mandrel, of a die about said mandrel adapted to interfold the edges of adjacent convolutions of the strip, wheels for rolling down the seam after the tube has passed the die and screw-threads at the end of said mandrel and within the tube for supporting the same under said wheels.

21. In an apparatus for forming tubing from a strip, the combination with a rotating mandrel, of a die about the same, said mandrel gripping said strip to draw it through said die, said die having channels for receiving the strip to be operated upon including channels having cam walls for bending the strip edges transversely of the strip and adapted to interfold said edges to unite adjacent convolutions of said strip, said die also having a succession of bending rolls at the entrance to said die for bending said strip preparatory to its entry into said channels, said die being formed of sections divided through said channels and including a stripping part for moving the strip through the die and the tube along the mandrel, said stripping part including a plurality of similar-shaped portions forming a screw-thread.

22. In an apparatus for forming tubing from a strip, the combination with a rotating mandrel, of a die about the same, said die having channels with cam walls adapted to transversely bend the said strip and a second set of cam walls adapted to interfold edges of the strip and unite adjacent convolutions of the said strip after it leaves the aforesaid walls, said die further comprising a succession of bending rolls positioned adjacent the point of entry of the strip into the die and adapted to preliminarily bend said strip into an arc, said die further comprising stripping members adapted to move the tube along the mandrel, said stripping members comprising a plurality of similarly-shaped washers having helical portions and adapted when fitted together side by side to form a screw-thread for moving the tube along the mandrel, said mandrel having a smooth surface along which the tube may longitudinally slide and an arc-shaped finger of radial thickness increasing toward its free end and adapted to support the said strip and force it into engagement with said rolls.

23. In an apparatus for forming tubing from a strip, the combination with a rotating mandrel, of a die about the same, said mandrel gripping said strip to draw it through the die, said die having channels with walls adapted to interfold the edges of adjacent convolutions of the strip, and said die also comprising a roll acting upon said strip, said die having longitudinally displaced sections and said roll being mounted between and journaled in said sections whereby the roll may be removed or inserted by separating said sections and means for clamping the sections together whereby they are held in proper relative position and the roll is secured in place.

In testimony whereof I have signed this specification this 30th day of April 1929.

R. HARRY STONE.